United States Patent Office 2,975,180
Patented Mar. 14, 1961

2,975,180

4,7-DIAMINO-2-ARYL-6-PTERIDINECARBOX-AMIDES

Thomas S. Osdene, 11 S. Brandywine St., West Chester, Pa., and Edward C. Taylor, 288 Western Way, Princeton, N.J.

No Drawing. Filed May 12, 1959, Ser. No. 812,601

7 Claims. (Cl. 260—251.5)

This invention relates to new 4,7-diamino-2-aryl-6-pteridinecarboxamides which have useful pharmacodynamic activity.

The compounds of this invention have very potent diuretic and natriuretic activity with a minimum of side effects.

The novel 4,7-diamino-2-aryl-6-pteridinecarboxamides of this invention are represented by the following structural formula:

Formula I

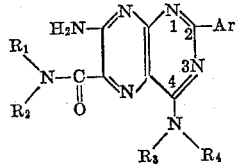

when: Ar represents phenyl

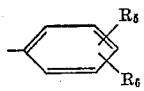

or thienyl; $R_1$ and $R_2$ represents hydrogen, lower alkyl, ω-hydroxy-lower alkylene, ω-acetoxy-lower alkylene, ω-chloro-lower alkylene or ω-amino-lower alkylene; $R_3$ and $R_4$ represent hydrogen or lower alkyl; and $R_5$ and $R_6$ represent hydrogen, halogen having an atomic weight of less than 80, lower alkyl, lower alkoxy, nitro, amino or hydroxy.

Advantageous compounds of this invention are represented by the following structural formula:

Formula II

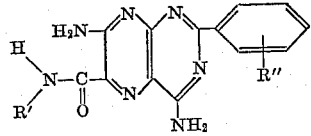

when: R′ represents hydrogen, methyl or ethyl; and R″ represents hydrogen, halogen having an atomic weight of less than 80, methyl, methoxy, nitro, amino or hydroxy.

The advantageous and preferred compounds of this invention are represented by the following structural formula:

Formula III

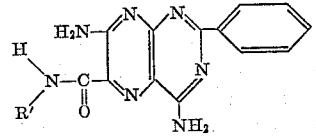

when: R′ represents hydrogen, methyl or ethyl.

A compound of particularly advantageous diuretic activity and therefore the preferred object of this invention is 4,7-diamino-2-phenyl-6-pteridinecarboxamide.

By the terms "lower alkyl" and "lower alkoxy" where used herein aliphatic groups having a maximum of 4 carbon atoms and preferably not more than 2 carbon atoms are indicated. The term "lower alkylene" where used herein alone or in combination with other terms represents an alkylene chain having 2 to 4, preferably 2 carbon atoms. The term "lower alkylene" further indicates that a chain of at least 2 carbon atoms separates the hetero atoms to which the alkylene chain is attached.

The compounds of this invention are prepared according to the following synthetic procedure:

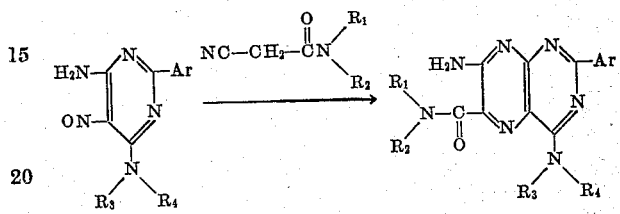

The terms Ar, $R_1$, $R_2$, $R_3$ and $R_4$ are as previously defined.

A 4,6-diamino-2-aryl-5-nitrosopyrimidine is reacted with an α-cyanoacetamide usually in excess, in a suitable organic solvent in which the reactants are substantially soluble such as a lower alcohol, for example ethanol or isopropanol, ethoxyethanol or, advantageously, dimethylformamide, usually in the presence of an alkali metal alkoxide such as a potassium or sodium alkoxide, for example sodium methoxide, potassium methoxide or sodium ethoxide, usually in excess. The reaction mixture is heated conveniently at temperatures of from about 50° C. to about 200° C. preferably at reflux temperature for about five to about thirty minutes. Longer reaction periods are of no particular advantage. Dilution of the mixture with approximately an equal volume of water results in the precipitation of the compound of this invention which may be isolated by filtration and purified by recrystallization from a suitable solvent such as aqueous dimethylformamide.

The 4-unsubstituted amino-6-amino-2-aryl-5-nitrosopyrimidine intermediates are prepared by the reaction of an amidine hydrohalide such as hydrochloride or hydrobromide, with, preferably, a slight excess of the silver salt of isonitrosomalonitrile in a lower alcohol solvent, such as methanol or ethanol, and the thermal cyclization of the resulting amidine salt in an organic solvent such as, for example, 5-ethyl-2-methylpyridine, 2- or 3-picoline, pyridine or quinoline or in mixtures of these solvents. The cyclization is conveniently carried out by heating at reflux temperature for about 5 to about 60 minutes. A ratio of one gram of amidine salt to about five grams of solvent is advantageous.

The 4-alkylamino-6-amino-2-aryl-5-nitrosopyrimidine intermediates are prepared by condensing an amidine hydrohalide, such as preferably hydrochloride or hydrobromide, with, preferably, a slight excess of ethyl cyanoacetate in a lower alcohol solvent such as ethanol or methanol in the presence of an alkali metal alkoxide, for example sodium methoxide, sodium ethoxide or potassium ethoxide. The reactants are heated conveniently at the reflux temperature of the solvent for approximately three to six hours. Working up the reaction mixture by evaporating the solvent, adding water to the residue, cooling and isolating the precipitate by filtration gives the 6-amino-2-aryl-4-pyrimidol. Treatment of this pyrimidol with a chlorinating agent such as phosphorus pentachloride, thionyl chloride or, preferably, phosphorus oxychloride advantageously in the presence of an acid-binding agent such as dimethylaniline or pyridine gives 6-amino- 2-aryl-4-chloropyrimidine. Reaction of this chloropyrimidine with at least an equivalent amount of alkylamine in aqueous solution yields 4-alkylamino-6-amino-2-arylpyrimidine. Treatment of this 4-alkylamino-6-amino-2-arylpyrimidine in acid solution with at least an equivalent amount of sodium nitrite at about $+5°$ to $-5°$ C. gives the 4-alkylamino-6-amino-2-aryl-5-nitrosopyrimidine intermediate.

The amidine hydrohalide starting materials, having substituents in the meta or para positions, are conveniently prepared by passing dry hydrogen chloride into a lower alcohol solution, preferably methanol or ethanol, of the appropriate benzonitrile. The resulting solution is allowed to stand at room temperature while it sets to a solid cake which is then treated with an excess of dry ammonia in absolute alcohol, such as methanol or ethanol. The reaction mixture is shaken for about 10 to 20 hours then allowed to stand for about 48 hours. The mixture is worked up by filtering, evaporating to dryness, dissolving the residue in water and acidifying with concentrated hydrohalic acid, for example hydrochloric or hydrobromic acid, concentrating and filtering the amidine hydrohalide.

The o-substituted amidine hydrohalide starting materials are conveniently prepared by treatment of the o-substituted benzonitrile with, preferably, a slight excess of hydroxylamine hydrochloride in lower alcohol solution, such as ethanol or methanol, in the presence of an alkali metal alkoxide such as sodium or potassium alkoxide, for example, sodium ethoxide or potassium methoxide. The reactants are heated conveniently at the reflux temperature of the solvent for about six to ten hours and the mixture worked up to give the o-substituted benzamidoxime which is hydrogenated in lower alcohol solution, such as methanol or ethanol, using a hydrogenation catalyst such as Raney nickel at about 60° to 70° C. until the theoretical amount of hydrogen is taken up. The alcohol solution is filtered, evaporated to dryness and the residue dissolved in hot alcohol such as methanol or ethanol. Cooling the solution and treating with hydrogen halide causes precipitation of the o-substituted amidine hydrohalide.

The N-alkyl-α-cyanoacetamide intermediates are prepared by treatment of a lower alkyl ester, preferably the methyl or ethyl ester, of α-cyanoacetic acid with at least a molar equivalent of an alkylamine in a lower alcohol solution, such as methanol or ethanol at about $-5°$ to about $+10°$ C. The reaction is carried out in the presence of an alkali metal alkoxide, such as a potassium or sodium alkoxide, for example, sodium methoxide, potassium ethoxide or sodium ethoxide, in lower alcohol solution such as ethanol or methanol. The reaction mixture is stirred at room temperature for about 10 to about 20 hours. Working up the mixture by evaporating to dryness and recrystallizing the residue from a suitable solvent such as ether gives the N-alkyl-α-cyanoacetamide.

The following examples are not limiting but are illustrative of compounds of this invention and will serve to make fully apparent all of the compounds embraced by the general formula given above.

*Example 1*

A mixture of 10.7 g. of 4,6-diamino-5-nitroso-2-phenylpyrimidine, 5.0 g. of cyanoacetamide and an ethanol solution of sodium ethoxide (prepared by dissolving 1.0 g. of sodium in 400 ml. of absolute ethanol) is heated at reflux for 30 minutes. The reaction mixture is chilled to 0° C. and filtered to give 4,7-diamino-2-phenyl-6-pteridinecarboxamide as a yellow solid, M.P. 360° C., which is recrystallized from aqueous dimethylformamide.

*Example 2*

α-Cyano-N-ethylacetamide (1.23 g.) and 0.6 g. of sodium methoxide are added to a hot solution of 2.15 g. of 4,6-diamino-5-nitroso-2-phenylpyrimidine in 50 ml. of dimethylformamide. The resulting mixture is refluxed for five minutes. Water (50 ml.) is added and the resulting crystals are filtered off, washed with water and recrystallized from aqueous dimethylformamide to give 4,7-diamino-N-ethyl-2 - phenyl - 6 - pteridinecarboxamide, M.P. 336.5–338° C.

*Example 3*

A solution of 49.5 ml. of ethyl α-cyanoacetate in 100 ml. of ethanol is added to 100 ml. of a solution of 36 ml. of isopropylamine in ethanol at 0° C. Twenty drops of an ethanol solution of sodium ethoxide are added and the resulting mixture is stirred overnight at room temperature. The solvent is removed in vacuo and the residue is recrystallized from ether to give α-cyano-N-isopropylacetamide.

To a solution of 2.15 g. of 4,6-diamino-5-nitroso-2-phenylpyrimidine in 50 ml. of boiling dimethylformamide is added 1.39 g. of α-cyano-N-isopropylacetamide and 0.6 g. of sodium methoxide and the resulting mixture is refluxed for five minutes. Hot water (25 ml.) is added and the solid material is filtered off and recrystallized from aqueous dimethylformamide to give 4,7-diamino-N-isopropyl-2-phenyl-6-pteridinecarboxamide, M.P. 347.5–349° C.

*Example 4*

To a solution of 6.45 g. of 4,6-diamino-5-nitroso-2-phenylpyrimidine in 150 ml. of boiling dimethylformamide is added 3.7 g. of α-cyano-N,N-dimethylacetamide and 1.78 g. of sodium methoxide. The resulting mixture is refluxed for five minutes and treated with 150 ml. of boiling water. Cooling, filtering and recrystallizing the product from aqueous dimethylformamide yields 4,7-diamino-N,N-dimethyl-2-phenyl - 6 - pteridinecarboxamide, M.P. >300° C.

*Example 5*

α-Cyano-N-methylacetamide (3.24 g.) and 1.78 g. of sodium methoxide are added to a boiling solution of 6.45 g. of 4,6-diamino-5-nitroso-2-phenylpyrimidine in 150 ml. of dimethylformamide and the resulting mixture is refluxed for five minutes. Boiling water (150 ml.) is added and the mixture is cooled and filtered. The yellow crystals are recrystallized from dimethylformamide-water to give 4,7-diamino-N-methyl-2-phenyl-6-pteridinecarboxamide.

*Example 6*

To a stirred solution of 9.55 g. of p-chlorobenzamidine hydrochloride in 200 ml. of methanol is added, slowly, 11.1 g. of the silver salt of isonitrosomalononitrile. The resulting mixture is stirred for one hour and filtered. The filtrate is evaporated to dryness at 30–35° C. To the residue is added 150 ml. of a solution of 5-ethyl-2-methylpyridine and 2-picoline (2:1). The resulting solution is refluxed for 20 minutes. Addition of water and ethanol precipitates a dark green solid which is isolated by filtration and washed with ethanol to give 4,6-diamino-2-(p-chlorophenyl)-5-nitrosopyrimidine.

Cyanoacetamide (2.1 g.) and 1.08 g. of sodium methoxide are added to a solution of 4.93 g. of 4,6-diamino-2-(p-chlorophenyl)-5-nitrosopyrimidine in 350 ml. of boiling dimethylformamide and the boiling continued for ten minutes. The solution is cooled, diluted with 350 ml. of water and the precipitate filtered off and recrystallized from water-dimethylformamide to give tan needles of 4,7-diamino-2-(p-chlorophenyl)-6-pteridinecarboxamide.

*Example 7*

A solution of 4.65 g. of p-anisamidine hydrochloride in 50 ml. of methanol is treated with 5.55 g. of the silver salt of isonitrosomalononitrile and the resulting mixture is stirred for one hour. The mixture is filtered and the filtrate concentrated to dryness in vacuo at 30–40° C. The residual solid is boiled for five minutes in 30 ml. of 5-ethyl-2-methyl-pyridine. The solution is cooled, diluted with ethanol and filtered. The dark green solid obtained is 4,6-diamino-2-(p-methoxyphenyl)-5-nitrosopyrimidine, M.P. 278° C. (dec.).

Cyanoacetamide (2.71 g.) and sodium methoxide (1.74 g.) are added to a boiling solution of 7.17 g. of 4,6-diamino-2-(p-methoxyphenyl)-5-nitrosopyrimidine in 150 ml. of dimethylformamide. The refluxing is continued for five minutes. Boiling water (150 ml.) is added, the mixture is cooled and filtered. The yellow crystals thus obtained are recystallized from dimethylformamide-water to give 4,7-diamino-2-(p-methoxyphenyl)-6-pteridinecarboxamide.

Example 8

To a solution of 7.94 g. of p-toluamidine hydrochloride in 80 ml. of methanol is added 11.1 g. of the silver salt of isonitrosomalononitrile. The mixture is stirred for 45 minutes, filtered and concentrated to dryness in vacuo at 30–40° C. The residual yellow crystals are boiled with 50 ml. of 5-ethyl-2-methylpyridine for ten minutes. The mixture is cooled and treated with ethanol. The precipitate is filtered off and washed with ethanol and ether to give 4,6-diamino-5-nitroso-2-(p-tolyl)-pyrimidine, M.P. 279–280° C. (dec.).

Sodium methoxide (1.78 g.) is added to a boiling solution of 6.88 g. of 4,6-diamino-5-nitroso-2-(p-tolyl)-pyrimidine and 2.78 g. of cyanoacetamide in 200 ml. of dimethylformamide. After the solution is boiled 10 minutes, 200 ml. of boiling water is added. The mixture is cooled, filtered and the solid extracted with 250 ml. of boiling water, then recrystallized from dimethylformamide-water to give yellow needles of 4,7-diamino-2-(p-tolyl)-6-pteridine-carboxamide.

Example 9

To a boiling solution of 10.8 g. of 4,6-diamino-5-nitroso-2-phenylpyrimidine, 7.0 g. of α-cyano-N-(2-hydroxyethyl)-acetamide and 200 ml. of dimethylformamide is added 3.0 g. of sodium methoxide. The resulting mixture is refluxed for ten minutes. Boiling water (200 ml.) is added and the mixture is cooled and filtered. The crystals thus obtained are recrystallized from dimethylformamide-water to give 4,7-diamino-6-(2-hydroxyethyl)-2-phenyl-6-pteridine-carboxamide, M.P. 308.5–309.5° C.

Example 10

To a solution of 60 ml. of diethanolamine in 100 ml. of ethanol at 0° C. is added a solution of 50.0 ml. of ethyl α-cyanoacetate in 100 ml. of ethanol. Twenty drops of an ethanol solution of sodium ethoxide is added and the mixture is stirred overnight at room temperature. The solvent is removed in vacuo and the residue is recrystallized from ether to give α-cyano-N,N-di-(2-hydroxyethyl)-acetamide.

The above prepared acetamide (3.8 g.) and sodium methoxide (1.2 g.) are added to a solution of 4.3 g. of 4,6-diamino-5-nitroso-2-phenylpyrimidine in 150 ml. of dimethylformamide. After the solution is refluxed for 15 minutes, 150 ml. of boiling water is added and the mixture is allowed to cool. The precipitate is isolated by filtration and recrystallized to give 4,7-diamino-N,N-di-(2-hydroxyethyl)-2-phenyl-6-pteridinecarboxamide.

Example 11

Anhydrous hydrogen chloride is bubbled into a solution of 1.60 g. of 4,7-diamino-N-(2-hydroxyethyl)-2-phenyl-6-pteridinecarboxamide, prepared as in Example 9, in 125 ml. of dimethylformamide until a slight excess is present. Thionyl chloride (5.0 ml.) in 10 ml. of dimethylformamide is added and the resulting mixture is allowed to stand 48 hours at room temperature. The solvent and excess thionyl chloride are removed in vacuo to give, as the residue, 4,7-diamino-N-(2-chloroethyl)-2-phenyl-6-pteridinecarboxamide.

Example 12

To a solution of 1.6 g. of 4.7-diamino-N-(2-hydroxyethyl)-2-phenyl-6-pteridinecarboxamide, prepared as in Example 9, in 75 ml. of dimethylformamide is added 0.5 g. of acetyl chloride in 25 ml. of dimethylformamide. The resulting mixture is allowed to stand at room temperature overnight and the solvent removed in vacuo to give as the residue, N-(2-acetoxyethyl)-4,7-diamino-2-phenyl-6-pteridinecarboxamide.

Example 13

A solution of 50.0 ml. of ethyl α-cyanoacetate in 100 ml. of ethanol is added to a solution of 70 g. of ethylenediamine in 65 ml. of ethanol at 0° C. An ethanolic solution of sodium ethoxide (20 drops) is added and the resulting mixture is stirred for 15 hours. Removal of the solvent in vacuo and the recrystallization of the residue from ether yields N-(2-aminoethyl)-α-cyanoacetamide.

To a boiling solution of 10.7 g. of 4,6-diamino-5-nitroso-2-phenylpyrimidine, 7.0 g. of N-(2-aminoethyl)-α-cyanoacetamide and 200 ml. of dimethylformamide is added 3.7 g. of sodium methoxide. The resulting mixture is refluxed for five minutes and diluted with 200 ml. of boiling water. The mixture is cooled and filtered. The crystals are recrystallized from aqueous dimethylformamide to give 4,6-diamino-N-(2-aminoethyl)-2-penyl-6-pteridinecarboxamide.

Example 14

N-butyl-α-cyanoacetamide (3.0 g.) and 1.2 g. of sodium methoxide are added to a boiling solution of 4.5 g. of 4,6-diamino-5-nitroso-2-phenylpyrimidine in 100 ml. of dimethylformamide. The mixture is refluxed for ten minutes. Dilution with water (100 ml.), cooling, filtering and recrystallizing the thus obtained crystals from water-dimethylformamide gives 4,7-diamino-N-2-phenyl-6-pteridinecarboxamide.

Example 15

To a solution of 8.5 g. of m-aminobenzamidine hydrochloride in 150 ml. of methanol is added slowly 11.1 g. of the silver salt of isonitrosomalononitrile. The resulting mixture is stirred for one hour and filtered. The filtrate is evaporated in vacuo at 30–35° C. The residue is refluxed with a solution of 5-ethyl-2-methylpyrimidine (100 ml.) and 2-picoline (50 ml.) for 20 minutes. The mixture is cooled and diluted with water and ethanol. The precipitate is isolated by filtration and washed with ethanol to give a dark green solid, 4,6-diamino-2-(m-aminophenyl)-5-nitrosopyrimidine.

Treatment of this pyrimidine in dimethylformamide solution with cyanoacetate and sodium methoxide and working up as in Example 8 gives 4,7-diamino-2-(m-aminophenyl)-6-pteridinecarboxamide.

Example 16

A solution of 9.4 g. of o-chlorobenzamidine hydrochloride in 100 ml. of methanol is treated with 11.1 g. of the silver salt of isonitrosomalononitrile. The mixture is stirred for one hour and filtered. The filtrate is concentrated to dryness in vacuo at 30–40° C. The residue is refluxed with 75 ml. of 5-ethyl-2-methylpyridine for ten minutes. The mixture is cooled, diluted with ethanol and filtered. The solid material obtained is washed with ethanol and then with ether to give 4,6-diamino-2-(o-chlorophenyl)-5-nitrosopyrimidine.

Sodium methoxide (1.78 g.) is added to a boiling solution of 7.47 g. of 4,6-diamino-2-(o-chlorophenyl)-5-nitrosopyrimidine and 2.78 g. of cyanoacetamide in 100 ml. of dimethylformamide. Refluxing the mixture for ten minutes, adding 100 ml. of boiling water, cooling, filtering and recrystallizing the precipitate from dimethylformamide-water yields 4,7-diamino-2-(o-chlorophenyl)-6-pteridinecarboxamide.

Example 17

To a solution of 8.5 g. of m-toluamidine hydrochloride in 80 ml. of methanol is added 11.1 g. of the silver salt of isonitrosomalononitrile. The mixture is stirred for one hour, filtered and the filtrate concentrated to dryness in vacuo. The residue is refluxed with a mixture of 100 ml. of 5-ethyl-2-methylpyridine and 50 ml. of 2-picoline and worked up as in Example 16 to give 4,6-diamino-5-nitroso-2-(m-tolyl)-pyrimidine.

Sodium methoxide (1.78 g.) is added to a boiling solution of 6.87 g. of 4,6-diamino-5-nitroso-2-(m-tolyl)-pyrimidine and 2.78 g. of cyanoacetamide in 150 ml. of dimethylformamide. Working up the reaction mixture as in Example 16 gives 4,7-diamino-2-(m-tolyl)-6-pteridinecarboxamide.

Example 18

The silver salt of isonitrosomalononitrile (11.1 g.) is added to a solution of 10.8 g. of 4-hydroxy-3-nitrobenzamidine hydrochloride in 100 ml. of methanol and the resulting mixture is stirred for 30 minutes and filtered. The filtrate is concentrated to dryness in vacuo at 30–35° C. The residue is refluxed with 100 ml. of 5-ethyl-2-methylpyridine for ten minutes. Working up as in Example 16 gives 4,6-diamino-2-(4'-hydroxy-3'-nitrophenyl)-5-nitrosopyrimidine.

Cyanoacetamide (2.78 g.) and sodium methoxide (1.78 g.) are added to a boiling solution of 8.28 g. of 4,6-diamino-2-(4'-hydroxy-3'-nitrophenyl)-5-nitrosopyrimidine in 150 ml. of dimethylformamide. Refluxing the resulting mixture for ten minutes and working up as in Example 16 gives 4,7-diamino-2-(4'-hydroxy-3'-nitrophenyl)-6-pteridinecarboxamide.

Example 19

To a stirred solution of 5.7 g. of o-butoxybenzamidine hydrochloride in 75 ml. of ethanol is added portionwise 5.55 g. of the silver salt of isonitrosomalononitrile. The resulting mixture is stirred for one hour and filtered. The filtrate is evaporated to dryness and the residue is refluxed for ten minutes in 50 ml. of 5-ethyl-3-methylpyridine, cooled and treated with 50 ml. of ethanol. Collection of the solid material by filtration gives 4,6-diamino-2-(o-butoxyphenyl)-5-nitrosopyrimidine.

Cyanoacetamide (2.7 g.) and then sodium methoxide (1.74 g.) are added to a boiling solution of 8.4 g. of 4,6-diamino-2-(o-butoxyphenyl)-5-nitrosopyrimidine in 150 ml. of dimethylformamide. The mixture is refluxed for five minutes then treated with 150 ml. of boiling water, cooled and filtered. The solid material is washed with water and recrystallized from aqueous dimethylformamide to give 4,7-diamino-2-(o-butoxyphenyl)-6-pteridinecarboxamide.

Example 20

The silver salt of isonitrosomalononitrile (5.55 g.), is added slowly in small portions to a stirred solution of 5.1 g. of 2-amino-4-chlorobenzamidine hydrochloride in 75 ml. of methanol. The resulting mixture is stirred for one hour and filtered. Evaporating the filtrate to dryness, refluxing the residue with 50 ml. of 2-picoline, cooling, adding 50 ml. of ethanol and filtering gives 4,6-diamino-2-(2'-amino-4'-chlorophenyl)-5-nitrosopyrimidine.

To a refluxing solution of 7.7 g. of 4,6-diamino-2-(2'-amino-4'-chlorophenyl)-5-nitrosopyrimidine in 150 ml. of dimethylformamide is added 2.7 g. of cyanoacetamide and 1.7 g. of sodium methoxide and the refluxing is continued for ten minutes. Hot water (150 ml.) is added and the mixture is cooled and filtered. The crystals thus obtained are recrystallized from aqueous dimethylformamide to give 4,7-diamino-2-(2'-amino-4'-chlorophenyl)-6-pteridinecarboxamide.

Example 21

To a solution of 7.0 g. of m-bromobenzamidine hydrobromide in 75 ml. of methanol is added 5.5 g. of the silver salt of isonitrosomalononitrile. The resulting solution is stirred for 30 minutes and filtered. The filtrate is evaporated to dryness in vacuo. The residue is boiled for fifteen minutes in 50 ml. of 5-ethyl-2-methylpyridine, cooled and 50 ml. of ethanol is added. The solid material, 4,6-diamino-2-(m-bromophenyl)-5-nitrosopyrimidine, is isolated by filtration.

α-Cyano-N-methylacetamide (3.2 g.) and 1.78 g. of sodium methoxide are added to a hot solution of 8.8 g. of 4,6-diamino-2-(m-bromophenyl)-5-nitrosopyrimidine in 125 ml. of dimethylformamide. The mixture is refluxed for ten minutes, diluted with 125 ml. of boiling water, cooled and filtered. The crystals thus obtained are recrystallized from aqueous dimethylformamide to give 4,7-diamino-2-(m-bromophenyl)-N-methyl-6-pteridinecarboxamide.

Example 22

Dry hydrogen chloride is passed into an ethanol solution of p-ethylbenzonitrile (13.1 g.). The resulting solution is allowed to stand for 48 hours. The solid cake is broken up, crushed in a mortar and treated with 3.0 g. of dry ammonia in absolute ethanol. The reaction mixture is shaken for 20 hours, allowed to stand for 48 hours and filtered. The filtrate is allowed to evaporate to dryness and the residue is taken up in water. The aqueous solution is acidified with concentrated hydrochloric acid, decolorized with charcoal, filtered and the filtrate concentrated. Crystals of p-ethylbenzamidine hydrochloride are isolated by filtration.

The silver salt of isonitrosomalononitrile (11.1 g.) is added to a solution of 9.2 g. of p-ethylbenzamidine hydrochloride in 100 ml. of methyl alcohol. Working up the reaction mixture and refluxing with 5-ethyl-2-methylpyridine as in Example 21 gives 4,6-diamino-2-(p-ethylphenyl)-5-nitrosopyrimidine.

Cyanoacetamide (2.78 g.) and sodium methoxide (1.78 g.) are added to a boiling solution of 4,6-diamino-2-(p-ethylphenyl)-5-nitrosopyrimidine (7.3 g.) in 125 ml. of dimethylformamide. The mixture is refluxed for ten minutes, then worked up as in Example 21 to give 4,7-diamino-2-(p-ethylphenyl)-6-pteridinecarboxamide.

Example 23

A cooled ethanol solution of 21.2 g. of 3-bromo-4-methoxybenzonitrile is treated with dry hydrogen chloride. The resulting mixture is allowed to stand for 48 hours. The solid cake is crushed in a mortar and then treated with an ethanol solution containing 3.0 g. of dry ammonia. Working up as in Example 22 gives 3-bromo-p-anisamidine hydrochloride.

To a stirred solution of 6.6 g. of 3-bromo-p-anisamidine hydrochloride in 50 ml. of methanol is added 5.55 g. of the silver salt of isonitrosomalononitrile. The resulting mixture is stirred for one hour, filtered and concentrated to dryness in vacuo at 30–40° C. The residue is refluxed for ten minutes in 30 ml. of 5-ethyl-2-methylpyridine and 15 ml. of 2-picoline. Dilution with aqueous ethanol and filtration gives 4,6-diamino-2-(3'-bromo-4'-methoxyphenyl)-5-nitrosopyrimidine.

This pyrimidine in dimethylformamide solution is treated with cyanoacetamide and sodium methoxide and worked up as in Example 21 to give 4,7-diamino-2-(3'-bromo-4'-methoxyphenyl)-6-pteridinecarboxamide.

Example 24

A solution of 3.6 g. of sodium in 55 ml. of ethanol is added to a mixture of 10.0 g. of hydroxyl amine hydrochloride in 20 ml. of water and 17.2 g. of 2-butyl-3-methoxybenzonitrile in 35 ml. of ethanol. The resulting mixture is refluxed for eight hours with stirring, then evaporated to dryness. Aqueous sodium hydroxide solution (10%) is added to the residue, the mixture is filtered and the filtrate acidified with glacial acetic acid. The precipitate, which is 2-butyl-3-methoxybenzamidoxime, is isolated by filtration.

The 2-butyl-3-methoxybenzamidoxime (11.0 g.) in ethanol solution in the presence of Raney nickel is hydrogenated at 65° C. until the theoretical amount of hydrogen is taken up. The mixture is filtered and evaporated to dryness in vacuo. The residue is dissolved in hot ethanol. The mixture is cooled, treated with dry hydrogen chloride and the 2-butyl-3-methoxy-benzamidine hydrochloride is isolated by filtration.

The silver salt of isonitrosomalononitrile (5.5 g.) is added to a stirred solution of 6.0 g. of 2-butyl-3-methoxy-benzamidine hydrochloride in 50 ml. of methanol. The resulting mixture is stirred for one hour, filtered and evaporated to dryness in vacuo. To the residue is added 50 ml. of 5-ethyl-2-methylpyridine and the resulting solution is refluxed for twenty minutes, then diluted with aqueous ethanol and filtered to give 4,6-diamino-2-(2'-butyl-3'-methoxyphenyl)-5-nitrosopyrimidine.

Cyanoacetamide (2.7 g.) and sodium methoxide (1.7 g.) are added to a boiling solution of 8.7 g. of 4,6-diamino-2-(2'-butyl-3'-methoxyphenyl)-5-nitrosopyrimidine in 150 ml. of dimethylformamide. The resulting mixture is refluxed for five minutes, treated with 150 ml. of boiling water, cooled and filtered. The solid material is recrystallized from aqueous dimethylformamide to give 4,7-diamino-2-(2'-butyl-3'-methoxyphenyl) - 6 - pteridinecarboxamide.

Example 25

Dry hydrogen chloride is passed into a cooled solution of 54.5 g. of 3-thiophenecarbonitrile in 75 ml. of absolute ethanol and the resulting solution is allowed to stand for 48 hours. To the solid is added portionwise an 8% solution of dry ammonia in absolute ethanol containing 12 g. of ammonia. The reaction mixture is shaken for 24 hours, allowed to stand for 48 hours and filtered. The filtrate is allowed to evaporate to dryness in the open air. The residue is dissolved in water. The aqueous solution is acidified with concentrated hydrochloric acid, treated with charcoal, filtered and concentrated. The crystals which form are isolated by filtration to give 3-thiophenecarboxamidine hydrochloride.

To a solution of 8.1 g. of 3-thiophenecarboxamidine hydrochloride in 80 ml. of methyl alcohol is added 11.1 g. of the silver salt of isonitrosomalononitrile. The resulting mixture is stirred for 30 minutes and filtered. The filtrate is evaporated to dryness in vacuo. The residue is refluxed with 50 ml. of 5-ethyl-2-methylpyridine for twenty minutes. The mixture is cooled, diluted with 100 ml. of ethanol and filtered to give 4,6-diamino-5-nitroso-2-(3'-thienyl)-pyrimidine.

Sodium methoxide (1.78 g.) is added to a boiling solution of 4,6-diamino-5-nitroso-2-(3'-thienyl)-pyrimidine (6.6 g.) and cyanoacetamide (2.78 g.) in 150 ml. of dimethylformamide. The mixture is refluxed for ten minutes, diluted with 150 ml. of boiling water, cooled and filtered. The solid material is recrystallized from aqueous dimethylformamide to give 4,7-diamino-2-(3'-thienyl)-6-pteridinecarboxamide.

Example 26

Treatment of 54.5 g. of 2-thiophene-carbonitrile in ethanol solution with dry hydrogen chloride and subsequently with an ethanolic solution of ammonia and working up as in Example 25 yields 2-thiophenecarboxamidine hydrochloride.

The above-prepared hydrochloride (4.0 g.) is reacted with 5.6 g. of the silver salt of isonitrosomalononitrile in methanol solution and cyclized by subsequent refluxing with 35 ml. of 5-ethyl-2-methylpyridine as in Example 25 to give 4,6-diamino-5-nitroso-2-(2'-thienyl)-pyrimidine. This pyrimidine is treated with cyanoacetamide and sodium methoxide in dimethylformamide solution to give 4,7-diamino-2-(2'-thienyl)-6-pteridinecarboxamide.

Example 27

To a mixture of 20 g. of 6-amino-2-phenyl-4-pyrimidol and 10 ml. of dimethylaniline is added 100 ml. of phosphorus oxychloride. The resulting mixture is refluxed for eight hours, then concentrated in vacuo. The residue is poured into water and treated with an excess of concentrated ammonium hydroxide. After heating the mixture on a steam bath for one hour, concentrating in vacuo and cooling, the precipitate is filtered off, washed with water and ground in a mortar with 15 ml. of 1 N sodium hydroxide. The solid material is filtered off and washed with water to give 6-amino-4-chloro-2-phenyl-pyrimidine.

Ten grams of 6-amino-4-chloro-2-phenyl-pyrimidine and 25 ml. of 25% aqueous methylamine are heated in a bomb at 125° C. for four hours. The product, 6-amino-4-methylamino-2-phenylpyrimidine, is isolated by filtration.

A mixture of 11.4 g. of 6-amino-4-methyl-amino-2-phenylpyrimidine and 200 ml. of 10% acetic acid is heated to 90° C. and filtered. The solution is cooled to 3° C. and treated with a solution of 5.0 g. of sodium nitrite in 15 ml. of water added portionwise. After one hour at 0° C. and one hour at room temperature, the mixture is filtered. The solid material obtained is washed with water and dried to give 6-amino-4-methylamino-5-nitroso-2-phenylpyrimidine.

Sodium methoxide (1.78 g.) is added to a boiling solution of 6.87 g. of 6-amino-4-methylamino-5-nitroso-2-phenylpyrimidine and 2.78 g. of cyanoacetamide in 150 ml. of dimethylformamide. The resulting mixture is refluxed for ten minutes, treated with 150 ml. of boiling water, cooled and filtered. The solid material is recrystallized from dimethylformamide-water to give 7-amino-4-methylamino-2-phenyl-6-pteridinecarboxamide.

Example 28

A mixture of 8.0 g. of 6-amino-4-chloro-2-phenylpyrimidine, prepared as in Example 27, and 30 ml. of 25% aqueous dimethylamine is heated in a bomb at 125° C. for four hours. 6-amino-4-dimethylamino-2-phenylpyrimidine is isolated from the mixture by filtration.

Ten grams of 6-amino-4-dimethylamino-2-phenylpyrimidine and 150 ml. of 10% acetic acid are heated at 90° C. and filtered. The mixture is cooled to 0° C. A solution of 4.0 g. of sodium nitrite in 10 ml. of water is added portionwise and the resulting mixture allowed to stand for one hour at 0° C. and one hour at room temperature. The precipitate is filtered off, washed with water and dried to give 6-amino-4-dimethylamino-5-nitroso-2-phenylpyrimidine.

Treatment of the above prepared nitroso-pyrimidine with cyanoacetamide and sodium methoxide in dimethylformamide solution and working up as in Example 27 gives 7 - amino-4-dimethylamino-2-phenyl-6-pteridinecarboxamide.

Example 29

Ten grams of 6-amino-4-chloro-2-phenyl-pyrimidine, made as in Example 27, and 7.5 g. of dibutylamine in aqueous solution are refluxed for five hours. Filtering the resulting mixture gives 6-amino-4-dibutylamino-2-phenylpyrimidine.

A mixture of 10.0 g. of the above prepared pyrimidine and 150 ml. of acetic acid are heated to 90° C., then filtered and cooled to 0° C. Four grams of sodium nitrite in aqueous solution are added portionwise. The mixture is allowed to stand for one hour at 0° C. and one hour at room temperature and the precipitated 6-amino-4-dibutylamino-5-nitroso-2-phenylpyrimidine is removed by filtration.

To a refluxing solution of 9.8 g. of 6-amino-4-dibutylamino-5-nitroso-2-phenylpyrimidine in 150 ml. of dimethylformamide is added 2.78 g. of cyanoacetamide followed by 1.78 g. of sodium methoxide. The resulting mixture is refluxed for ten minutes. Boiling water (150 ml.) is added and the mixture is cooled and filtered. The solid material is recrystallized from aqueous dimethylformamide to give 7-amino-4-dibutylamino-2-phenyl-6-pteridinecarboxamide.

What is claimed is:

1. A chemical compound having the following structural formula:

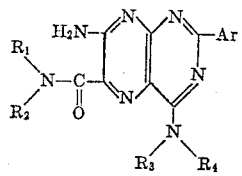

in which Ar is a member selected from the group consisting of

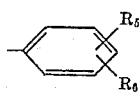

and thienyl; $R_1$ and $R_2$ are members selected from the group consisting of hydrogen, lower alkyl, ω-hydroxy-lower alkylene, ω-acetoxy-lower alkylene, ω-chloro-lower alkylene and ω-amino-lower alkylene; $R_3$ and $R_4$ are members selected from the group consisting of hydrogen and lower alkyl; and $R_5$ and $R_6$ are members selected from the group consisting of hydrogen halogen having an atomic weight of less than 80, lower alkyl, lower alkoxy, nitro, amino and hydroxy.

2. 4,7-diamino-2-phenyl-6-pteridinecarboxamide.

3. 4,7 - diamino-N-lower-alkyl-2-phenyl-6-pteridinecarboxamide.

4. 4,7 - diamino-N-methyl-2-phenyl-6-pteridinecarboxamide.

5. 4,7-diamino - N - ethyl-2-phenyl-6-pteridinecarboxamide.

6. 4,7-diamino-2-(p-tolyl)-6-pteridinecarboxamide.

7. 4,7-diamino-2-(m-tolyl)-6-pteridinecarboxamide.

References Cited in the file of this patent

Osdene et al.: J. Chem. Soc. (London) (1955), pages 2036–8.